United States Patent Office 3,214,344
Patented Oct. 26, 1965

3,214,344
FERMENTATIVE PRODUCTION OF SUBSTANCES RELATING TO NUCLEIC ACID
Shukuo Kinoshita, Katsunobu Tanaka, and Kazuo Oshima, Tokyo, and Kazuo Kimura, Sagamihara-shi, Japan, assignors to Kyowa Hakko Kogyo Co., Ltd., Tokyo, Japan, a corporation of Japan
No Drawing. Filed July 31, 1962, Ser. No. 213,608
Claims priority, application Japan, May 13, 1961, 36/16,418
20 Claims. (Cl. 195—28)

This application is a continuation-in-part of Ser. No. 194,147, filed May 11, 1962, and now abandoned.

The present invention relates to a method of culturing a microorganism in a culturing medium containing an orotate, i.e. orotic acid or a salt of orotic acid. Orotic acid (or a salt thereof) is an important metabolic intermediate for the biosynthesis of nucleic acid; the presence of orotate in a culturing medium during fermentation assists measurably in the production and accumulation of substances relating to nucleic acid.

The word "substances relating to nucleic acid" referred to in the specification and claims means the substances which absorb specifically ultraviolet light, and includes nucleic acid bases, their nucleoside and nucleotide. More specifically, it includes the following substances:

|  | Molecular weight | M.P. | Solubility in water (g./100 ml.) |
|---|---|---|---|
| Base: |  |  |  |
| Orotic acid | 156.1 | 345 | Hardly soluble. |
| Thymine | 126.1 | 318–21 | 0.404. |
| Uracil | 112.1 | 335 | 0.358. |
| Cytosine | 111.1 | 320–5 | 0.775. |
| Riboside: |  |  |  |
| Orotidine | 306.1 |  | Easily soluble. |
| Thymidine | 242.2 | 186 |  |
| Uridine | 244.2 | 163.5 |  |
| Cytidine | 243.2 | 212–5 | Easily soluble. |
| Ribotide: |  |  |  |
| 5'-OMP (Orotidine-5'-phosphate). | 385.1 |  |  |
| 5'-thymidine nucleotide | 322.2 |  |  |
| 5'-uridylic acid | 324.2 |  | Easily soluble. |
| 5'-cytidylic acid | 323.2 | 232–4 | Soluble. |

An object of the present invention is to provide an easy method of producing pyrimidine bases, their nucleosides, their nucleotides and related substances from orotate with a high yield. Other objects are apparent from the description which follows.

By culturing a microorganism mentioned below in a culturing medium containing carbon sources, nitrogen sources, inorganic salts, organic nutrient and orotate, substances related to nucleic acid can be formed microbiologically and accumulated abundantly in the culturing medium. The orotate present in the medium during fermentation is utilized for the synthesis, for example, of pyrimidine bases in the form of organic bases, their nucleosides or nucleotides, without being taken into the biosynthesis of nucleic acid in the cell bodies.

The strains of microorganisms suitable for the production of nucleic acid related substances are widely distributed throughout the natural world, e.g. among bacteria, yeasts, fungi, ray fungi, etc. According to the present invention, substantial accumulations of nucleic acid related substances are obtained microbiologically by fermentation in culturing media containing orotate.

The widespread distribution of microorganisms according to the present invention and the products produced thereby are reflected in Table 1. The microorganisms are in no way limited with respect to species, genus, family or class. The production of nucleic acid related substances is not reflected in accepted taxonomical classification and thus does not respect the artificial established lines.

TABLE 1

|  | Products | |
|---|---|---|
|  | Uracil | Other than Uracil |
| Bacillus megaterium de Bary IAM Bact 1–12 | − | + |
| Bacillus natto IAM-1–3 | ++ | + |
| Bacillus subtilis NRRL 558 IAM | − | + |
| Bacillus cadaveris NCTC 6578 | ++ | + |
| Bacillus succinicum | + | + |
| Bacillus subtilis PC 1 219 | + | + |
| Bacillus subtilis No. 2 | + | + |
| Bacillus subtilis No. 3 | − | + |
| Bacillus subtilis No. 4 | + | + |
| Bacillus subtilis No. 5 | − | + |
| Bacillus subtilis No. 6 | ++ | + |
| Bacillus subtilis IFO No. 3026 | ++ | + |
| Bacillus subtilis IFO No. 3027 | − | + |
| Bacillus subtilis IFO No. 3033 | − | + |
| Bacillus subtilis IFO No. 3035 | − | + |
| Bacillus subtilis IFO No. 3036 | − | + |
| Bacillus subtilis 13 IAM | − | + |
| Bacillus subtilis 14 IAM | − | + |
| Bacillus subtilis threonine less 23 IAM-2 | + | + |
| Bacillus subtilis threonine less 115 IAM-2 | ++ | + |
| Bacillus subtilis H | − | + |
| Bacillus firmus B-206-6 | − | ± |
| Bacillus macerans ATCC 3483 | − | ± |
| Bacillus pumilus B-205-9 IAM | − | ± |
| Bacillus roseus B-206-10 | − | ++ |
| Bacillus sphaericus B-205-8 IAM | − | ± |
| Brevibacterium ammoniagenes ATCC 6871 | ± | − |
| Brevibacterium ammoniagenes ATCC 6872 | − | ± |
| Bacillus circulans Jordan No. 3342 | + | ± |
| Bacillus circulans Jordan No. 3329 | ± | ± |
| Bacillus coagulans Hammer No. 3557 | ± | ± |
| Bacillus firmus Werner No. 3330 | − | ± |
| Bacillus macerans Schardinger IFO No. 3482 | ± | ± |
| Bacillus macerans Schardinger IFO No. 3483 | − | ± |
| Bacillus macerans Schardinger IFO No. 3490 | − | ± |
| Bacillus pumilus Gottheil IFO No. 3028 | − | ± |
| Bacillus pumilus Gottheil IFO No. 3030 | ± | ± |
| Bacillus sphaericus Nieide IFO No. 3341 | − | ± |
| Brevibacterium acetylicum ATCC 954 | − | ± |
| Corynebacterium michiganense ATCC 10202 | + | − |
| Corynebacterium rathayi ATCC 13659 | ± | − |
| Brevibacterium helvolum ATCC 11822 | + | − |
| Brevibacterium vitraumen ATCC 10234 | + | − |
| Brevibacterium acetylicum ATCC 953 | + | − |
| Escherichia coli 15-75(15) his⁻, ade⁻, IAM-2 | ± | − |
| Escherichia coli 15-30(15) his⁻, IAM-2 | ± | − |
| Bacillus subtilis J | − | ± |
| Bacillus subtilis N | − | ± |
| Bacillus subtilis R | − | ± |
| Bacillus subtilis T | − | + |
| Bacillus licheniformis RSII 2001 | − | + |
| Bacillus licheniformis 4 td 12 | + | + |
| Bacillus licheniformis 4 tdd 1 | − | + |
| Bacillus licheniformis 4 tdd 20 | + | + |
| Bacillus licheniformis 3-11 | ++ | + |
| Bacillus cereus Frankland et Frankland No. 3001 | +++ | + |
| Bacillus cereus Frankland et Frankland No. 3002 | +++ | + |
| Bacillus cereus Frankland et Frankland No. 3131 | +++ | + |
| Alcaligenes faecalis 1AM-Bact 3-8 | − | + |
| Alcaligenes faecalis ACC-104 | + | + |
| Alcaligenes faecalis ACC-105 | − | + |
| Azotobacter indicus Starkey et De ATCC 9037 | − | + |
| Azotobacter indicus ATCC 9540 | − | + |
| Aerobacter aerogenes ATCC 8308 | − | + |
| Aerobacter aerogenes ACTU; (108) | − | + |
| Aerobacter aerogenes ACTU; (109) | − | + |
| Aerobacter aerogenes ACTU; (109) | − | + |
| Aerobacter aerogenes ACTU; (112) | − | + |
| Aerobacter aerogenes ACTU; (530) | − | + |
| Aerobacter aerogenes ACTU; (531) | − | + |
| Aerobacter aerogenes 1AM | + | + |
| Bacillus cereus Frankland et Frankland No. 3132 | +++ | + |
| Bacillus cereus Frankland et Frankland No. 3466 | ++ | ± |
| Bacillus cereus ATCC 9818 | +++ | ± |
| Bacillus cereus ATCC 7483 | − | ± |
| Bacillus cereus ATCC 7064 | +++ | − |
| Bacillus cereus var. mycoides Smith, Gorden et Clark No. 3039 | − | ± |
| Bacillus cereus ATCC 7004 | ± | ± |
| Bacillus cereus ATCC 7039 | ++ | ± |
| Bacillus cereus ATCC 7064 | ± | ± |
| Bacillus cereus ATCC 9139 | ++ | ± |
| Bacillus cereus ATCC 9592 | ++ | ± |
| Bacillus cereus ATCC 9620 | ++ | ± |
| Bacillus cereus ATCC 9634 | ++ | ± |
| Bacillus cereus ATCC 9818 | + | ± |
| Bacillus cereus var. mycoides 6463 | − | ± |
| Bacillus cereus var. mycoides 6462 | − | ± |
| Bacillus licheniformis RCI 0202 | − | ± |
| Bacillus licheniformis RCI 3008 | − | ± |
| Bacillus licheniformis RCII 0202 | − | ± |
| Bacillus licheniformis RSI 0205 | − | ± |
| Bacillus licheniformis 3-15 | − | ± |
| Bacillus licheniformis 3-17 | − | ± |
| Bacillus licheniformis 30 | − | ± |

TABLE 1—Continued

| | Products | |
|---|---|---|
| | Uracil | Other than Uracil |
| Bacillus circulans | ± | ± |
| Bacillus coagulans ATCC 7050 | ± | ± |
| Serratia marcescens No. 18 1AM | + | − |
| Sarcina lutea 1AM Bact 2-1 | ++ | − |
| Micrococcus glutamicus 521 | + | − |
| Micrococcus glutamicus 582 | + | − |
| Micrococcus glutamicus 560 | + | − |
| Torula candida Saito NFR | ± | − |
| Sake Hefe (Kiyokai No. 7) NFR-1011 | + | − |
| Bread yeast-Fleischman NFR-1071 | + | − |
| Candida tropicalis Zatsu-6-10 | + | − |
| Streptomyces albogriseolus NRRL B-1305 | + | − |
| Streptomyces flaveolus P-10 | + | − |
| Streptomyces flavochromogenus H-3206 | + | − |
| Streptomyces griseoflavus 261-2-1 | + | − |
| Streptomyces lavendulae ATCC 8664 | + | − |
| Streptomyces rimosus NRRL 2234 | + | − |
| Rhizopus acetorinus 1-29 | ± | − |
| Rhizopus chungkuoensis var. isofermentaricus 16-29 1AM | + | − |
| Aspergillus amstelodami (Mangin) Thom et Church | ++ | − |

From the table above, it will be seen that the microorganisms are classified into three groups, that is, (1) produce uracil, (2) produce other ultraviolet light absorbable substances, and (3) produce the both substances. A number of Bacilli produce uracil and among them Bacillus cereus is the strongest. Substances other than uracil include nucleic acid bases of pyrimidines, their nucleosides and nucleotides; orotidine and uridylic acid by Bacillus roseus and thymidylic acid by Bacillus subtilis are clearly identified.

Orotic acid or a salt thereof is added to culturing medium. The culturing medium otherwise contains carbohydrates (carbon source), e.g. glucose, fructose, lactose, maltose, sucrose, pentose, molasses, starch, starch hydrolyzate and organic acid; nitrogen source, e.g. organic nitrogenous nutrients, such as soy bean cake, peptone, meat extract, yeast, NZ-amine and amino acids and/or inorganic nitrogen sources, such as ammonia and inorganic salts thereof (ammonium sulfate, ammonium phosphate, ammonium chloride, etc.); inorganic salts, e.g. potassium phosphate, magnesium sulfate, ferrous sulfate, manganese sulfate; and any other component essential to the growth of the particular microorganism employed. Additional components, such as vitamins, can also be present in the fermentation medium. The medium is neutralized prior to fermentation.

A strain yielding substance related to nucleic acid, for example one of those indicated in Table 1, is inoculated in medium (as defined above) and cultured at pH 4.0–9.0 under aeration agitation or stationary culture at the growing temperature for the microorganism. A pH of from 4.0–7.0 is preferable for the production of uracil. The microorganism propagated in the medium gradually metabolizes the orotic acid (or orotic acid salt) present in said medium to produce and accumulate substance related to nucleic acid in the fermentation medium; the amount of desired product increases with elapsed fermentation time.

The solubility in the fermentation medium of ammonium or sodium orotate is about 1 to 2 milligrams (mg.)/milliliter (ml.). The amount of orotate beyond the solubility is present in the medium in the crystalline (solid) state and is gradually dissolved and metabolized as orotate is consumed and the culturing proceeds. Thus, it is one feature of the present invention that the necessary precursor (the orotate) for the production of the desired product (substance related to nucleic acid) is always present in the medium at a low concentration and is continuously supplied to the medium in metabolizable form.

The product substances are nucleic acid constituents and physiologically important. They have recently been noticed for medicines and test reagents.

The specific examples are directed to particular embodiments illustrative of the invention and are not to be construed as in any way limitative.

*Example 1*

Into a 2 liter Erlenmeyer flask 200 ml. of medium are placed. The medium has the following constitution:

| | Percent by weight |
|---|---|
| Glucose | 5.0 |
| Ammonium sulfate | 0.2 |
| $K_2HPO_4$ | 0.1 |
| $MgSO_4 \cdot 7H_2O$ | 0.075 |
| Urea | 0.2 |
| Ammonium orotate | 1.5 |
| Yeast extract | 0.1 |
| Meat extract | 1.0 |
| Water | Remainder |

The medium is sterilized prior to use. The medium is inoculated with Bacillus cereus ATCC 9818 and cultured under shaking culture at 28° C. At the end of two days' culturing, the concentration of uracil in the medium is 8.7 grams (g.)/liter (l.).

| | Grams/100 milliliter | |
|---|---|---|
| | Before cultivation | After cultivation |
| $NH_4$ orotate (solution) | 0.56 | 0.00 |
| $NH_4$ orotate (solid) | 0.94 | 0.00 |
| Uracil (solution) | 0.00 | 0.36 |
| Uracil (solid) | 0.00 | 0.51 |

By concentrating 100 ml. of the filtered fermentation liquor to 10 ml. and cooling the concentrate to room temperature 0.85 g. of crude crystals of uracil are obtained. These crude crystals are filtered, dissolved in 50 ml. of $H_2O$ and crystallized to give 0.8 g. of uracil. Uracil was identified by ultra-violet absorption, infra-red absorption, elemental analysis and melting point.

*Example 2*

Into a 2 liter Erlenmeyer flask 200 ml. of medium are placed. The medium is the same as that employed in Example 1, except the amount of ammonium orotate is 0.56 percent by weight. The medium is inoculated with Bacillus roseus B-206-10 and cultured for three days under the same conditions as in Example 1. The resulting fermentation liquor, containing 1 g./l. orotidine and 1 g./l. of uridylic acid, is filtered. The filtrate (one liter) is subjected to conventional chromatographic separation with Dowex–1 (trade name), an anion exchange resin. From their respective fractions 0.8 g. of orotidine and 0.6 g. of uridylic acid are obtained. Orotidine is identified by ultra-violet absorption, elemental analysis, analysis of constituent base and sugar. Uridylic acid is identified by ultra-violet absorption, elemental analysis, and analysis of constituent base, sugar and phosphate.

*Example 3*

Medium (100 ml.) containing:

| | Percent by weight |
|---|---|
| Glucose | 5.0 |
| Orotic acid | 0.5 |
| Ammonium sulfate | 0.2 |
| $K_2HPO_4$ | 0.1 |
| $MgSO_4 \cdot 7H_2O$ | 0.075 |
| Meat extract | 1.0 |
| Water | Remainder |

The medium is sterilized prior to use. The medium is inoculated with *Bacillus subtilis* and cultured under shaking culture at 30° C. for 3 days. After separation of cell bodies by filtration, the filtrate is treated in the same manner as in Example 2 to give 2 g./l., i.e. 0.2 g., of thymidine nucleotide which is identified by ultra-violet absorption, elemental analysis, and analysis of constituent base, sugar and phosphate.

*Example 4*

A medium (200 ml.) having the same composition as in Example 1 is inoculated with *Aspergillus niger* and cultured under shaking culture at 30° C. After 3 days' cultivation nucleotides (corresponding to 1 g./l. of uracil base) are produced in the cultivation liquor.

*Example 5*

Media (100 ml. each) having the same composition as in Example 3 are inoculated, respectively, with different microorganisms and cultured under shaking culture at 30° C. After 48 hours of culturing, the amount of substance in the fermentation liquor related to nucleic acid (determined as uracil base) is reflected in the following table:

TABLE 2

| Species: | Nucleic acid related substance, g./l. |
|---|---|
| *Alcaligenes faecalis* | 0.5 |
| *Aerobacter aerogenes* | 0.8 |
| *Bacillus subtilis* | 1.0 |
| *Corynebacterium michiganense* | 0.5 |
| *Escherichia coli* | 0.5 |
| *Flavobacterium arborescens* | 0.1 |
| *Serratia marcescens* | 0.5 |
| *Torula candida* | 0.4 |
| *Aspergillus candidus* | 0.8 |
| *Rhizopus acetolinus* | 0.5 |
| *Streptomyces bovilliae* | 0.6 |

The invention and its advantages will be understood from the foregoing description. It is apparent that various changes may be made in the process without departing from the spirit and scope of the invention or sacrificing its material advantages, the process hereinbefore described being merely illustrative of preferred embodiments of the invention.

What we claim is:

1. In a method for the production of an orotic acid derived nucleic acid related substance which comprises culturing a microorganism selected from the group consisting of bacteria, fungi and streptomyces in a culture medium containing an orotate selected from the group consisting of orotic acid and a salt of orotic acid, accumulating the nucleic acid related substance in said culture medium and separating said substance from said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

2. In a method for the production of pyrimidine base which comprises culturing a microorganism selected from the group consisting of bacteria, fungi and streptomyces in a culture medium containing an orotate selected from the group consisting of orotic acid and a salt of orotic acid, accumulating the nucleic acid related substance in said culture medium and separating said substance from said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

3. In a method for the production of pyrimidine base nucleoside which comprises culturing a microorganism selected from the group consisting of bacteria, fungi and streptomyces in a culture medium containing an orotate selected from the group consisting of orotic acid and a salt of orotic acid, accumulating the nucleoside in the said culture medium and separating the said nucleoside from the said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

4. In a method for the production of pyrimidine base nucleotide which comprises culturing a microorganism selected from the group consisting of bacteria, fungi and streptomyces in a culture medium containing an orotate selected from the group consisting of orotic acid and a salt of orotic acid, accumulating the nucleotide in said culture medium and separating the said nucleotide from said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

5. A method as in claim 1 wherein the orotate is ammonium orotate.

6. In a method for the production of an orotic acid derived nucleic acid related substance which comprises culturing an Aerobacter in a culture medium containing an orotate selected from the group consisting of orotic acid and a salt of orotic acid, accumulating the nucleic acid related substance in said culture medium and separating the said substance from the said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

7. In a method for the production of an orotic acid derived nucleic acid related substance which comprises culturing a Bacillus in a culture medium containing an orotate slected from the group consisting of orotic acid and a salt of orotic acid, accumulating the nucleic acid related substance in said culture medium and separating the said substance from the said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

8. In a method for the production of an orotic acid derived nucleic acid related substance which comprises culturing a Corynebacterium in a culture medium containing an orotate selected from the group consisting of orotic acid and a salt of orotic acid, accumulating the nucleic acid related substance in said culture medium and separating the said substance from the said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

9. In a method for the production of an orotic acid derived nucleic acid related substance which comprises culturing an Escherichia in a culture medium containing an orotate selected from the group consisting of orotic acid and a salt of orotic acid, accumulating the nucleic acid related substance in said culture medium and separating the said substance from the said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

10. In a method for the production of an orotic acid derived nucleic acid related substance which comprises culturing a Micrococcus in a culture medium containing an orotate selected from the group consisting of orotic acid and a salt of orotic acid, accumulating the nucleic acid related substance in said culture medium and separating the said substance from the said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

11. In a method for the production of an orotic acid derived nucleic acid related substance which comprises culturing an Alcaligenes in a culture medium containing an orotate selected from the group consisting of orotic acid and a salt of orotic acid, accumulating the nucleic acid related substance in said culture medium and separating the said substance from the said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

12. In a method for the production of an orotic acid derived nucleic acid related substance which comprises culturing a Serratia in a culture medium containing an orotate selected from the group consisting of orotic acid and a salt of orotic acid, accumulating the nucleic acid related substance in said culture medium and separating the said substance from the said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

13. In a method for the production of an orotic acid derived nucleic acid related substance which comprises culturing a Saccharomyces in a culture medium containing an orotate selected from the group consisting of orotic acid and a salt of orotic acid, accumulating the nucleic acid related substance in said culture medium and separating the said substance from the said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

14. In a method for the production of an orotic acid derived nucleic acid related substance which comprises culturing a Torula in a culture medium containing an orotate selected from the group consisting of orotic acid and a salt of orotic acid, accumulating the nucleic acid related substance in said culture medium and separating the said substance from the said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

15. In a method for the production of an orotic acid derived nucleic acid related substance which comprises culturing an Aspergillus in a culture medium containing an orotate selected from the group consisting of orotic acid and a salt of orotic acid, accumulating the nucleic acid related substance in said culture medium and separating the said substance from the said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

16. In a method for the production of an orotic acid derived nucleic acid related substance which comprises culturing a Rhizopus in a culture medium containing an orotate selected from the group consisting of orotic acid and a salt of orotic acid, accumulating the nucleic acid related substance in said culture medium and separating the said substance from the said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

17. In a method for the production of an orotic acid derived nucleic acid related substance which comprises culturing a Streptomyces in a culture medium containing an orotate selected from the group consisting of orotic acid and a salt of orotic acid, accumulating the nucleic acid related substance in said culture medium and separating the said substance from the said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

18. In a method for the production of an orotic acid derived nucleic acid related substance which comprises culturing a Flavobacterium in a culture medium containing an orotate selected from the group consisting of orotic acid and a salt of orotic acid, accumulating the nucleic acid related substance in said culture medium and separating the said substance from the said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

19. In a method for the production of an orotic acid derived nucleic acid related substance which comprises culturing a yeast in a culture medium containing an orotate selected from the group consisting of orotic acid and a salt of orotic acid, accumulating the nucleic acid related substance in said culture medium and separating the said substance from the said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

20. In a method for the production of nucleic acid an orotic acid derived related substance which comprises culturing a bacteria selected from the group consisting of *Bacillus megaterium, Bacillus natto, Bacillus subtilis, Bacillus cadaveris, Bacillus succinium, Bacillus firmus, Bacillus macerans, Bacillus pumilus, Bacillus roseus, Bacillus sphaericus, Brevibacterium ammoniagenes, Bacillus circulans, Bacillus coagulans, Bacillus macerans, Brevibacterium acetylicum, Corynebacterium michiganense, Corynebacterium rathayi, Brevibacterium helvolum, Brevibacterium vitarumen, Escherichia coli, Bacillus licheniformis, Bacillus cereus, Alcaligenes faecalis, Azotobacter indicus, Aerobacter aerogenes, Serratia marcescens, Sarcina lutea, Micrococcus glutamicus,* and *Flavobacterium arborescens* in a culture medium containing an orotate selected from the group consisting of orotic acid and a salt of orotic acid, accumulating the nucleic acid related substance in said culture medium and separating the said substance from the said culture medium, the improvement wherein the orotate is present in the culture medium in an amount in excess of the solubility in the said medium and is gradually dissolved from the crystalline form and metabolized as the culturing proceeds, the orotate being present in the said medium in a low concentration and being continuously supplied to the said medium in a metabolizable form.

References Cited by the Examiner
UNITED STATES PATENTS 2,822,319  2/58  Monod _____ 195—115

OTHER REFERENCES

Cook: The Chemistry and Biology of Yeasts, Academic Press, Inc., New York (1958), pages 495 and 496.

Lieberman et al.: J. Biol. Chem., vol. 215, pages 403 to 415 (1955).

Loring et al.: J. Biol. Chem., vol. 153, pages 61 to 69 (1944).

Wright et al.: J. Am. Chem. Soc., vol. 73, pages 1898 and 1899 (1951).

A. LOUIS MONACELL, *Primary Examiner.*

ABRAHAM H. WINKELSTEIN, *Examiner.*